(12) United States Patent
Chikuma

(10) Patent No.: US 12,283,427 B2
(45) Date of Patent: *Apr. 22, 2025

(54) MULTILAYER CERAMIC CAPACITOR AND METHOD OF MANUFACTURING MULTILAYER CERAMIC CAPACITOR

(71) Applicant: Murata Manufacturing Co., Ltd., Nagaokakyo (JP)

(72) Inventor: Shinobu Chikuma, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/426,641

(22) Filed: Jan. 30, 2024

(65) Prior Publication Data

US 2024/0170210 A1    May 23, 2024

Related U.S. Application Data

(63) Continuation of application No. 17/555,565, filed on Dec. 20, 2021, now Pat. No. 11,923,142.

(30) Foreign Application Priority Data

Dec. 22, 2020    (JP) ................................ 2020-212824

(51) Int. Cl.
  *H01G 2/06*     (2006.01)
  *H01G 4/008*   (2006.01)
  (Continued)

(52) U.S. Cl.
  CPC ............. *H01G 2/065* (2013.01); *H01G 4/008* (2013.01); *H01G 4/1227* (2013.01); *H01G 4/248* (2013.01); *H01G 4/30* (2013.01)

(58) Field of Classification Search
  None
  See application file for complete search history.

(56) References Cited

U.S. PATENT DOCUMENTS 10,777,356 B2 * 9/2020  Park ....................... H01G 4/248
11,848,155 B2 * 12/2023 Kimura .................. H01G 4/248
(Continued)

FOREIGN PATENT DOCUMENTS

JP  2015029009 A  2/2015
JP  2016143882 A  8/2016
(Continued)

OTHER PUBLICATIONS

Chikuma, "Multilayer Ceramic Capacitor and Method of Manufacturing Multilayer Ceramic Capacitor", U.S. Appl. No. 17/555,565, filed Dec. 20, 2021.

*Primary Examiner* — Dion R. Ferguson
(74) *Attorney, Agent, or Firm* — Keating & Bennett, LLP

(57) ABSTRACT

A multilayer ceramic capacitor includes a capacitor main body including a multilayer body in which dielectric layers and internal electrode layers are alternately laminated, and external electrodes respectively on two end surfaces of the multilayer body and connected to the internal electrode layers, an interposer at a board mounting surface of the capacitor main body, and an insulating resin film in a gap between the board mounting surface and a capacitor-facing surface of the interposer which is opposed to the board mounting surface.

15 Claims, 9 Drawing Sheets

(51) Int. Cl.
    *H01G 4/12*        (2006.01)
    *H01G 4/248*    (2006.01)
    *H01G 4/30*       (2006.01)

(56) References Cited

U.S. PATENT DOCUMENTS

| | | | |
|---|---|---|---|
| 11,923,142 B2 * | 3/2024 | Chikuma | ............... H01G 4/012 |
| 2010/0240821 A1 | 9/2010 | Nakamura et al. | |
| 2019/0096585 A1 | 3/2019 | Park et al. | |
| 2019/0148071 A1 | 5/2019 | Ji et al. | |
| 2019/0304684 A1 | 10/2019 | Yoshida et al. | |
| 2021/0225594 A1 * | 7/2021 | Hashimoto | ............ H01G 4/248 |

FOREIGN PATENT DOCUMENTS

| | | |
|---|---|---|
| JP | 2018006736 A | 1/2018 |
| JP | 2020061391 A | 4/2020 |
| KR | 20100009575 A | 1/2010 |
| KR | 20190036265 A | 4/2019 |
| KR | 20190036346 A | 4/2019 |

* cited by examiner

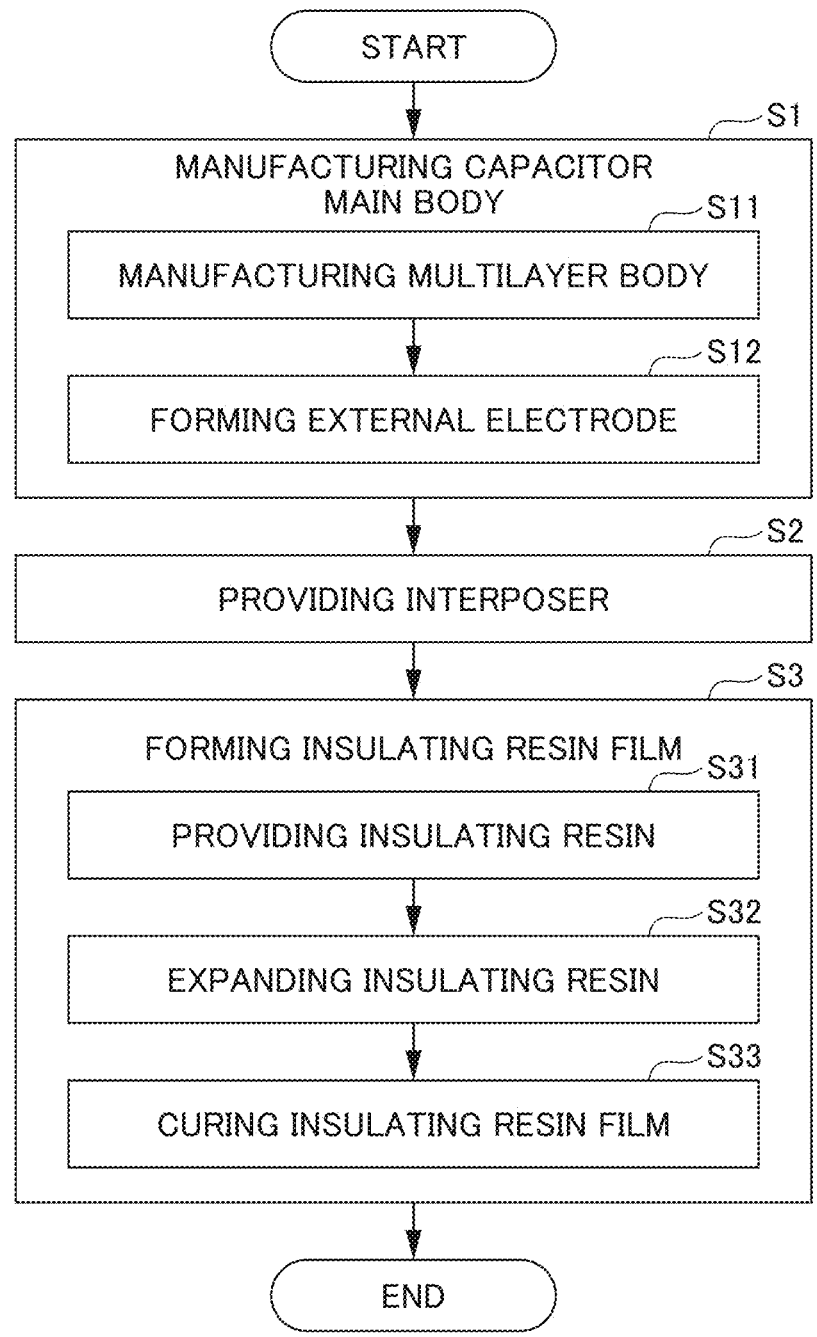

MULTILAYER CERAMIC CAPACITOR AND METHOD OF MANUFACTURING MULTILAYER CERAMIC CAPACITOR

CROSS REFERENCE TO RELATED APPLICATIONS

This application claims the benefit of priority to Japanese Patent Application No. 2020-212824 filed on Dec. 22, 2020. The entire contents of this application are hereby incorporated herein by reference.

BACKGROUND OF THE INVENTION

1. Field of the Invention

The present invention relates to a multilayer ceramic capacitor and a method of manufacturing a multilayer ceramic capacitor.

2. Description of the Related Art

Recently, a large-capacitance, small multilayer ceramic capacitor has been required. Such a multilayer ceramic capacitor has an inner layer portion in which internal electrodes and dielectric layers made of a ferroelectric material having relatively high dielectric constant are alternately stacked. Furthermore, dielectric layers functioning as outer layer portions are provided above and below the inner layer portion such that a rectangular parallelepiped multilayer body is provided, and external electrodes are provided on both end surfaces of the multilayer body in the longitudinal direction, such that a capacitor main body is provided.

Furthermore, in order to reduce or prevent the occurrence of "acoustic noise", a multilayer ceramic capacitor has been known which includes an interposer provided on the side of the capacitor main body mounted on a board (refer to PCT International Publication No. WO2015/098990).

However, when stress due to bending or other factors is applied to a board on which a multilayer ceramic capacitor is mounted, the end of the interposer presses the capacitor main body, such that there is a possibility that the stress is concentrated in the contact portion and cracks occur in the capacitor main body.

SUMMARY OF THE INVENTION

Preferred embodiments of the present invention provide multilayer ceramic capacitors that are each able to reduce or prevent stress concentration on a capacitor main body due to contact with an interposer, and methods of manufacturing such multilayer ceramic capacitors.

A preferred embodiment of the present invention provides a multilayer ceramic capacitor including a capacitor main body including a multilayer body in which dielectric layers and internal electrode layers are alternately laminated, and external electrodes respectively provided on two end surfaces of the multilayer body and connected to the internal electrode layers, an interposer at a board mounting surface of the capacitor main body, and an insulating resin film in a gap between the board mounting surface and a capacitor-facing surface of the interposer which is opposed to the board mounting surface.

According to preferred embodiments of the present disclosure, it is possible to provide multilayer ceramic capacitors that are each able to reduce or prevent stress concentration on a capacitor main body due to the contact with an interposer, and methods of manufacturing such multilayer ceramic capacitors.

BRIEF DESCRIPTION OF THE DRAWINGS

FIG. 4 is a flowchart showing a method of manufacturing the multilayer ceramic capacitor 1 according to a preferred embodiment of the present invention.

DETAILED DESCRIPTION OF THE PREFERRED EMBODIMENTS

First Preferred Embodiment

Figure 1:
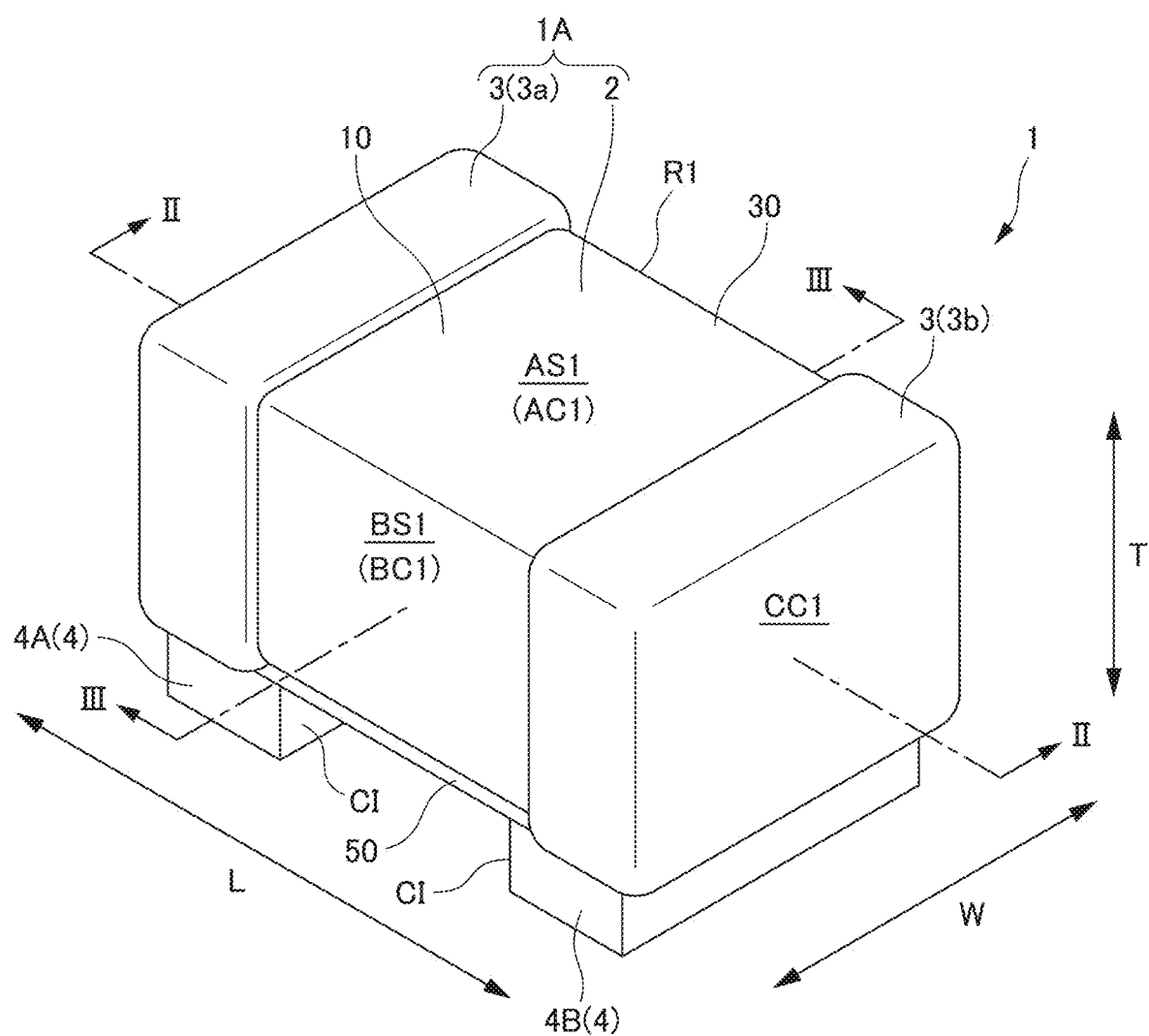
FIG. 1 is a schematic perspective view of a multilayer ceramic capacitor 1 according to a first preferred embodiment of the present invention.
Figure 2:
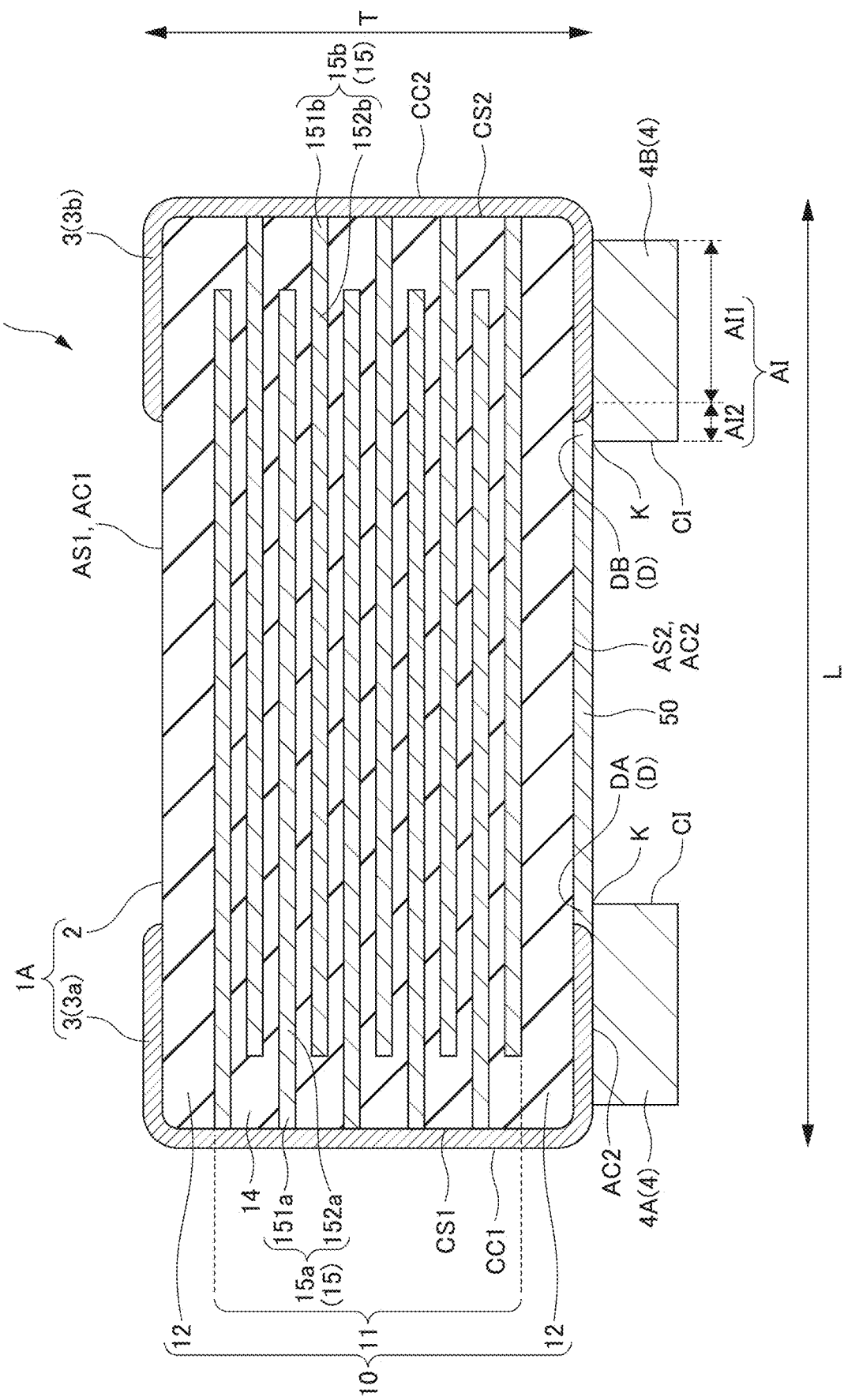
FIG. 2 is a cross-sectional view taken along the line II-II in FIG. 1 of the multilayer ceramic capacitor 1 according to the first preferred embodiment of the present invention.
Figure 3:
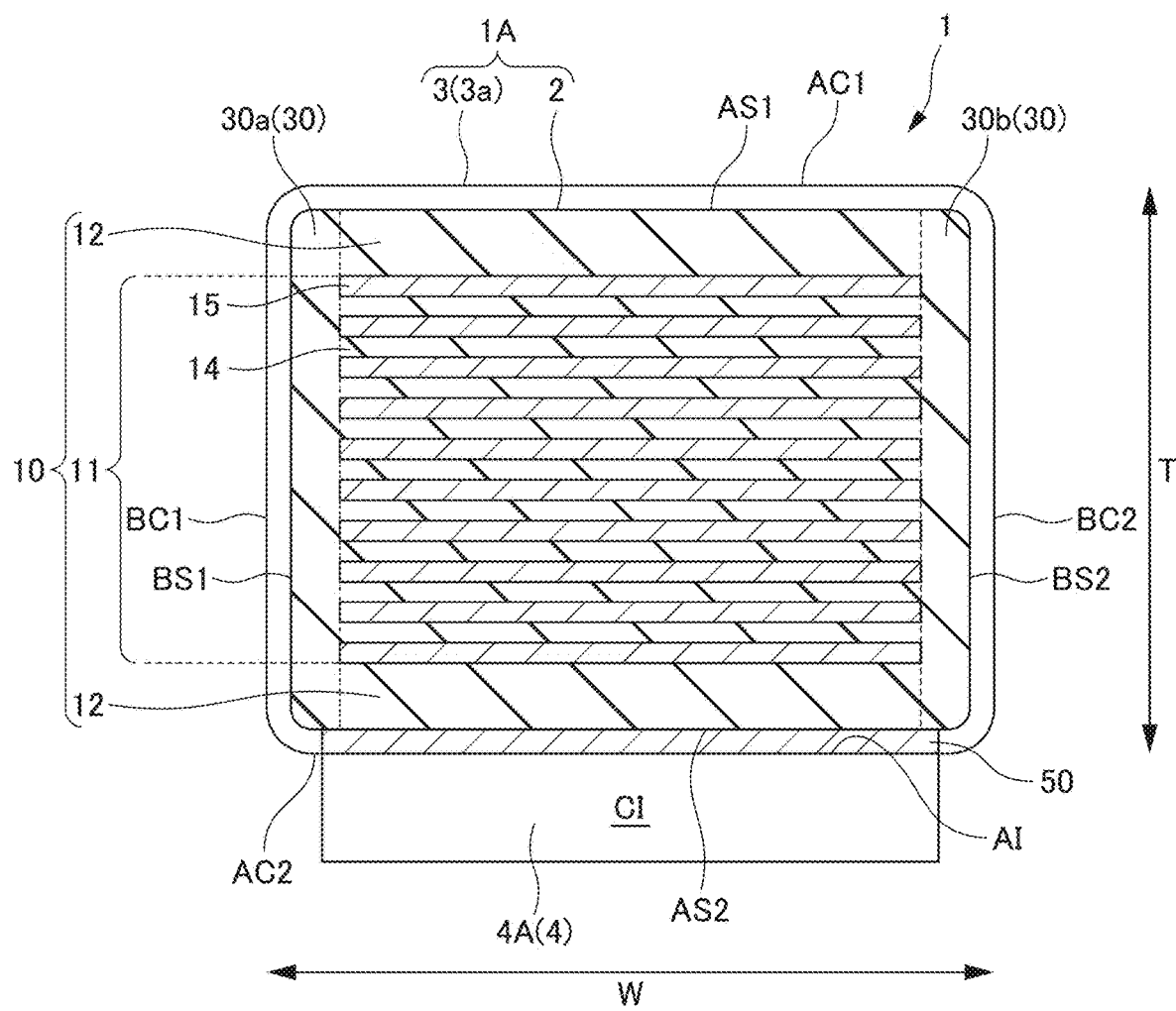
FIG. 3 is a cross-sectional view taken along the line III-III in FIG. 1 of the multilayer ceramic capacitor 1 according to the first preferred embodiment of the present invention.

A multilayer ceramic capacitor 1 according to a first preferred embodiment of the present invention will be described. FIG. 1 is a schematic perspective view of a multilayer ceramic capacitor 1 according to the first preferred embodiment. FIG. 2 is a cross-sectional view taken along the line II-II in FIG. 1 of the multilayer ceramic capacitor 1 according to the first preferred embodiment. FIG. 3 is a cross-sectional view taken along the line III-III in FIG. 1 of the multilayer ceramic capacitor 1 according to the first preferred embodiment.

The multilayer ceramic capacitor 1 has a rectangular or substantially rectangular parallelepiped shape. The multilayer ceramic capacitor 1 includes a capacitor main body LA including a multilayer body 2 and a pair of external electrodes 3 provided at both ends of the multilayer body 2, an interposer 4 attached to the capacitor main body LA, and an insulating resin film 50. Furthermore, the multilayer body 2 includes an inner layer portion 11 including a plurality of sets of dielectric layers 14 and internal electrode layers 15.

In the following description, as terms representing the orientation of the multilayer ceramic capacitor 1, a direction in which the pair of external electrodes 3 are provided is defined as a length direction L. A direction in which the dielectric layers 14 and the internal electrode layers 15 are laminated (stacked) is defined as a lamination (stacking) direction T. A direction intersecting both the length direction L and the lamination direction T is defined as a width direction W. In the preferred embodiments disclosed herein, the width direction W is perpendicular or substantially perpendicular to both the length direction L and the lamination direction T.

Outer Surface of Multilayer Body 2

Furthermore, among the six outer surfaces of the multilayer body 2, a pair of outer surfaces opposing in the lamination direction T are defined as a multilayer body first main surface AS1 and a multilayer body second main surface AS2, a pair of outer surfaces opposing in the width direction W are defined as a multilayer body first side surface BS1 and a multilayer body second side surface BS2, and a pair of outer surfaces opposing in the length direction L is defined as a multilayer body first end surface CS1 and a multilayer body second end surface CS2.

When it is not necessary to particularly distinguish between the multilayer body first main surface AS1 and the multilayer body second main surface AS2, they are collectively referred to as the multilayer body main surface AS, when it is not necessary to particularly distinguish between the multilayer body first side surface BS1 and the multilayer body second side surface BS2, they are collectively referred to as the multilayer body main surface BS, and when it is not necessary to particularly distinguish between the multilayer body first end surface CS1 and the multilayer body second end surface CS2, they are collectively referred to as the multilayer body end surface CS.

Outer Surface of Capacitor Main Body 1A

Furthermore, among the six outer surfaces of the capacitor main body 1A, a pair of outer surfaces opposing in the lamination direction T are defined as a capacitor first main surface AC1 and a capacitor second main surface AC2, a pair of outer surfaces opposing in the width direction W are defined as a capacitor first side surface BC1 and a capacitor second side surface BC2, and a pair of outer surfaces opposing in the length direction L are defined as a capacitor first end surface CC1 and a capacitor second end surface CC2. The capacitor second main surface AC2 also refers to a board mounting surface AC2 of the capacitor main body 1A.

When it is not necessary to particularly distinguish between the capacitor first main surface AC1 and the capacitor second main surface AC2, they are collectively referred to as the capacitor main surface AC, when it is not necessary to particularly distinguish between the capacitor first side surface BC1 and the capacitor second side surface BC2, they are collectively referred to as the capacitor main surface BC, and when it is not necessary to particularly distinguish between the capacitor first end surface CC1 and the capacitor second end surface CC2, they are collectively referred to as the capacitor end surface CC.

Outer Surface of Interposer 4

Furthermore, the interposer 4 includes a first interposer 4A and a second interposer 4B. Among six outer surfaces of these interposers, an outer surface in the vicinity of the capacitor main body LA of the pair of outer surfaces opposing in the lamination direction T is defined as a capacitor-facing surface AI, and surfaces, which face each other, of the first interposer 4A and the second interposer 4B provided in the length direction L are defined as interposer-facing surfaces CI.

The capacitor-facing surface AI of the interposer 4 and the board mounting surface AC2 of the capacitor main body LA are opposed to each other, and the interposer-facing surface CI of the first interposer 4A and the interposer-facing surface CI of the second interposer 4B are opposed to each other.

The multilayer body 2 is preferably rounded at ridge portions R1 including corners. The ridge portions R1 are each a portion where two surfaces of the multilayer body 2 intersect, i.e., the multilayer body main surface AS and the multilayer body side surface BS, the multilayer body main surface AS and the multilayer body end surface CS, or the multilayer body side surface BS and the multilayer body end surface CS intersect.

The dimensions of the multilayer body 2 are not particularly limited. However, for example, it is preferable that the dimension in the length direction L is about 0.2 mm or more and about 10 mm or less, the dimension in the width direction W is about 0.1 mm or more and about 10 mm or less, and the dimension in the lamination direction T is about 0.1 mm or more and about 5 mm or less.

Multilayer Body 2

The multilayer body 2 includes a multilayer body main body 10 including the inner layer portion 11, and outer layer portions 12 provided on both sides of the lamination direction T of the inner layer portion 11, and side gap portions 30 provided on both sides in the width direction W of the multilayer body main body 10.

Inner Layer Portion 11

The inner layer portion 11 includes a plurality of sets of dielectric layers 14 and internal electrode layers 15 which are alternately laminated in the lamination direction T.

The dielectric layer 14 each have a thickness of, for example, about 0.5 µm or less.

The dielectric layers 14 are each made of a ceramic material. As the ceramic material, for example, a dielectric ceramic including $BaTiO_3$ as a main component is used. Furthermore, as the ceramic material, those obtained by adding, for example, at least one of sub-components such as Mn compounds, Fe compounds, Cr compounds, Co compounds, and Ni compounds to these main components may be used. The number of dielectric layers 14 in addition to those in the outer layer portions 12 is preferably 15 or more and 700 or less, for example.

The internal electrode layer 15 includes a plurality of first internal electrode layers 15a and a plurality of second internal electrode layers 15b. The first internal electrode layers 15a and the second internal electrode layers 15b are alternately provided. When it is not necessary to distinguish the first internal electrode layer 15a from the second internal electrode layer 15b, they are collectively referred to as the internal electrode layer 15.

The first internal electrode layers 15a each include a first opposing portion 152a facing the second internal electrode layer 15b, and a first lead-out portion 151a extending from the first opposing portion 152a toward the first end surface CS1. The end portion of the first lead-out portion 151a is exposed at the first end surface CS1, and electrically connected to the first external electrode 3a to be described later.

The second internal electrode layers 15b each include a second opposing portion 152b facing the first internal electrode layer 15A, and a second lead-out portion 151b extending from the second opposing portion 152b toward the second end surface CS2. The end portion of the second lead-out portion 151b is electrically connected to the second external electrode 3b to be described later.

Furthermore, a charge is accumulated in the first opposing portion 152a of the first internal electrode layer 15A and the second opposing portion 152b of the second internal electrode layer 15B, such that the characteristics of the capacitor are developed.

The internal electrode layer 15 is preferably made of a metal material such as, for example, Ni, Cu, Ag, Pd, Ag—Pd alloy, Au or the like. The internal electrode layer 15 preferably has a thickness of about 0.5 µm or more to about 2.0 mm, for example. The number of the internal electrode layers 15 is preferably, for example, 15 or more and 700 or less in total of those in the first internal electrode layer 15a and the second internal electrode layer 15b.

Outer Layer Portion 12

The outer layer portions 12 are each made of the same material as the dielectric layers 14 of the inner layer portion 11. The outer layer portions 12 each preferably have a thickness of, for example, about 20 μm or less, and more preferably about 10 μm or less.

The side gap portions 30 each include a first side gap portion 30a provided in the vicinity of the multilayer body first side surface BS1 of the multilayer body main body 10, and a second side gap portion 30b provided in the vicinity of the multilayer body second side surface BS2 of the multilayer body main body 10.

When it is not necessary to particularly distinguish between the first side gap portion 30a and the second side gap portion 30b, they are collectively referred to as the side gap portion 30.

Side Gap Portion 30

The side gap portions 30 are each made of the same material as the dielectric layers 14. The side gap portions 30 each have a thickness of, for example, about 20 μm, and preferably about 10 μm or less.

External Electrode 3

The external electrode 3 includes a first external electrode 3a provided on the multilayer body first end surface CS1, and a second external electrode 3b provided on the multilayer body second end surface CS2. When it is not necessary to particularly distinguish between the first external electrode 3a and the second external electrode 3b, they are collectively referred to as the external electrode 3. The external electrodes 3 each cover not only the multilayer body end surface CS, but also cover a portion of the multilayer body main surface AS and a portion of the multilayer body side surface BS in the vicinity of the multilayer body end surface CS.

As described above, the end portion of the first lead-out portion 151a of the first internal electrode layer 15a is exposed at the multilayer body first end surface CS1, and is electrically connected to the first external electrode 3a. Furthermore, the end portion of the second lead-out portion 151b of the second internal electrode layer 15b is exposed at the multilayer body second end surface CS2, and is electrically connected to the second external electrode 3b. With such a configuration, a structure including a plurality of capacitor elements which are electrically connected in parallel is provided between the first external electrode 3a and the second external electrode 3b.

Furthermore, the external electrode 3 may include, for example, a two-layer structure including a foundation electrode layer and a plating layer. The plating layer may include one layer or two layers, for example. Furthermore, a conductive resin layer may be provided between the foundation electrode layer and the plating layer.

The foundation electrode layer is formed, for example, by applying and firing a conductive paste including a conductive metal and glass. As the conductive metal of the foundation electrode layer, Cu, Ni, Ag, Pd, Ag—Pd alloy, Au or the like can be used, for example.

The plating layer preferably includes plating made of a metal selected from the group including, for example, Cu, Ni, Su, Ag, Pd, Ag—Pd alloy, and Au, or an alloy including this metal.

Interposer 4

The interposer 4 includes the pair of a first interposer 4A and a second interposer 4B. Hereinafter, when it is not necessary to particularly distinguish between the first interposer 4A and the second interposer 4B, they are collectively referred to as the interposer 4.

In the vicinity of the board mounting surface AC2 of the capacitor main body 1A, the first interposer 4A is provided in the vicinity of the capacitor first end surface CC1 located on one side in the length direction L, and the second interposer 4B is provided in the vicinity of the capacitor second end surface CC2 located on the other side in the length direction L. The first interposer 4A and the second interposer 4B are of the same or substantially the same shape, are opposed to each other, and are spaced apart from each other by a predetermined distance.

The interposer 4 includes a member made of a material mainly including an intermetallic compound including at least one high melting point metal selected from, for example, Cu and Ni, and Sn as a low melting point metal. The interposer 4 includes, for example, elemental Sn metal apart from the intermetallic compound.

The Sn metal in the interposer 4 achieves favorable solderability in the interposer 4 when mounting the multilayer ceramic capacitor 1 on the board.

As shown in FIG. 2, the capacitor-facing surface AI of the interposer 4 includes an electrode connection region AI1 in contact with the portion where the external electrode 3 is provided, and an electrode non-connection region AI2 extending further toward the center in the length direction L from the electrode connection region AI1, in the vicinity of the board mounting surface AC2 of the capacitor main body LA.

A gap D having a thickness equal or substantially equal to the thickness of the external electrode 3 is provided between a portion of the board mounting surface AC2 of the capacitor main body LA where the external electrode 3 is not provided, i.e., a portion where the multilayer body second main surface AS2 is exposed, and the electrode non-connection region AI2. The gap D includes a gap DA in the vicinity of the first interposer 4A, and a gap DB in the vicinity of the second interposer 4B. The gap DA and the gap DB are provided so that the insulating resin film 50, which will be described later, penetrates therein.

Insulating Resin Film 50

The insulating resin film 50 includes a portion provided in the gap DA in the vicinity of the first interposer 4A, a portion provided in the gap DB in the vicinity of the second interposer 4B, and a portion for connecting the gap DA and the gap DB. That is, the insulating resin film 50 fills the gap DA and the gap DB, and extends along the board mounting surface AC2 of the capacitor main body 1A so as to connect the gap DA and the gap DB. In the first preferred embodiment, the insulating resin film 50 has a uniform or substantially uniform thickness in the lamination direction T. Furthermore, the insulating resin film 50 is made of, for example, polystyrene.

Method of Manufacturing Multilayer Ceramic Capacitor

FIG. 4 is a flowchart showing a non-limiting example of a method of manufacturing the multilayer ceramic capacitor 1 according to a preferred embodiment of the present invention. The method of manufacturing the multilayer ceramic capacitor 1 includes a capacitor main body manufacturing step S1, an interposer providing step S2, and an insulating resin film forming step S3.

FIGS. 5A-5D are diagrams for explaining the capacitor main body manufacturing step S1. FIGS. 6A-6F are diagrams for explaining the interposer providing step S2 and the insulating resin film forming step S3.

Capacitor Main Body Manufacturing Step S1

The capacitor main body manufacturing step S1 further includes a multilayer body manufacturing step S11 and an external electrode forming step S12.

Multilayer Body Manufacturing Step S11

A ceramic slurry including a ceramic powder, a binder, and a solvent is formed into a sheet shape on a carrier film using a die coater, a gravure coater, a microgravure coater, or other suitable coater, for example, to produce a multilayer ceramic green sheet 101 serving as the dielectric layer 14.

Then, a conductive paste is printed in a strip shape by, for example, screen printing, ink jet printing, gravure printing, or other printing methods on the multilayer ceramic green sheet 101, to produce a material sheet 103 in which conductive patterns 102 defining and functioning as the internal electrode layer 15 are printed on the surface of the multilayer ceramic green sheet 101.

Figure 5A:
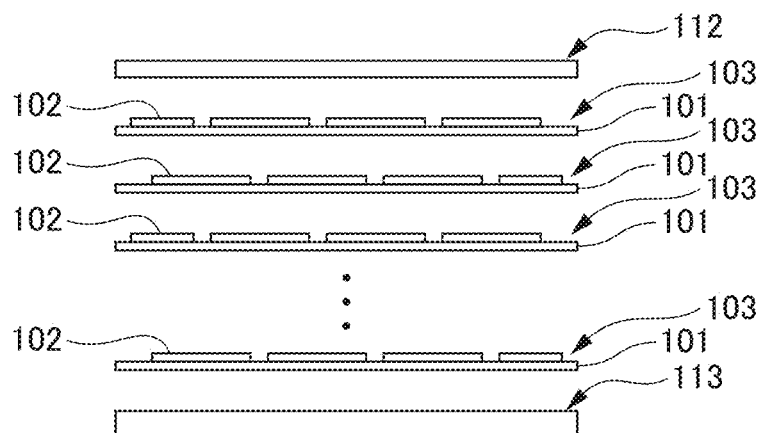
FIGS. 5A-5D are diagrams for explaining a capacitor main body manufacturing step S1.

Subsequently, as shown in FIG. 5A, a plurality of material sheets 103 are laminated such that the conductive patterns 102 are directed in the same or substantially the same direction and shifted by half pitch in the width direction between the adjacent material sheets 103.

Furthermore, upper outer layer portion ceramic green sheets 112 and 113 defining and functioning as the outer layer portions 12 are respectively stacked on both sides of the plurality laminated material sheets 103.

Figure 5B:
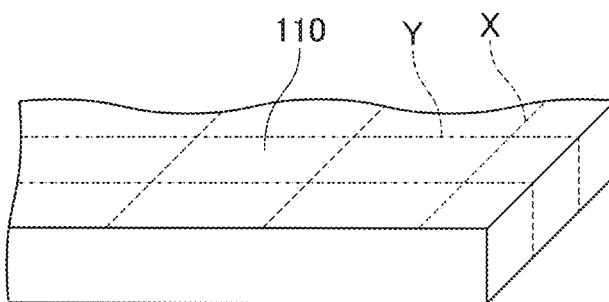

The plurality of stacked material sheets 103 and an outer layer portion ceramic green sheets 112 and 113 are subjected to thermocompression bonding, for example, to create a mother block 110 shown in FIG. 5B.

Figure 5C:
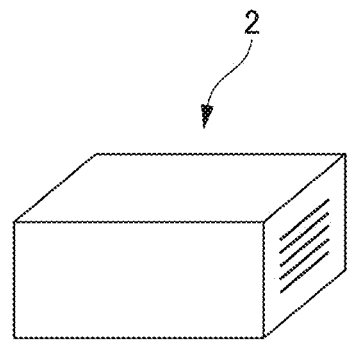

Then, the mother block 110 is cut along a cutting line X and a cutting line Y intersecting the cutting line X shown in FIG. 5B, to produce a plurality of multilayer body main bodies 10 shown in FIG. 5C.

External Electrode Forming Step S12

Figure 5D:
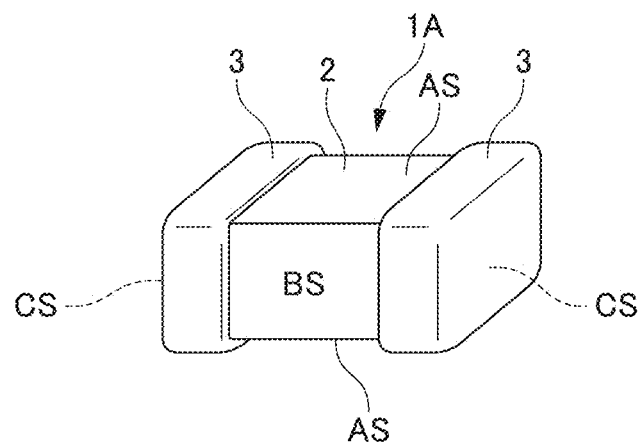

Subsequently, as shown in FIG. 5D, a conductive paste including a conductive metal and glass is applied to the multilayer body end surface CS of the multilayer body 2, and fired to form the external electrode 3. The external electrode 3 not only covers the multilayer body end surfaces CS on both sides of the multilayer body 2, but also extends to a portion of the multilayer body main surface AS and a portion of the multilayer body side surface BS to cover the portion of the multilayer body main surface AS in the vicinity of the multilayer body end surface CS. The capacitor main body LA is manufactured by the above steps.

Interposer Providing Step S2

A metal material paste including at least one high melting point metal selected from, for example, Cu and Ni as a material of the interposer, and Sn as a low melting point metal is prepared. In addition, a holding plate 40, such as an alumina plate, to which the metal material paste is not bonded under reflow conditions, is prepared.

Figure 6A:
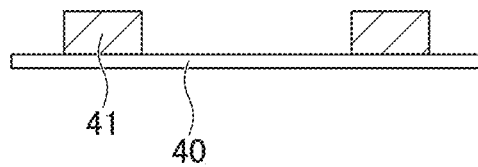
FIGS. 6A-6F are diagrams for explaining an interposer providing step S2 and an insulating resin film forming step S3.

As shown in FIG. 6A, a metal material paste thick film 41 is formed on the holding plate 40 by applying the metal material paste by a screen printing method, a dispensing method, or other methods, for example.

Figure 6B:
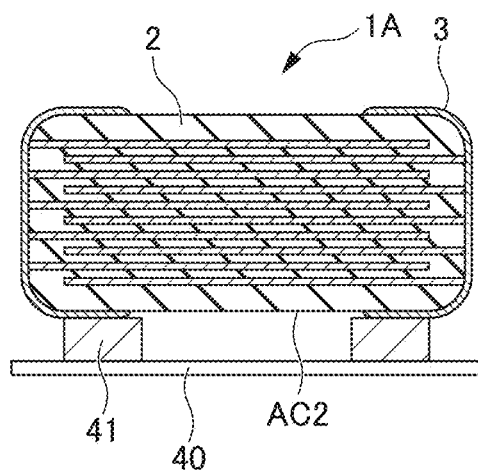

As shown in FIG. 6B, the capacitor main body LA is mounted on the holding plate 40 in an orientation in which the board mounting surface AC2 faces the holding plate 40. At this time, the external electrode 3 of the capacitor main body LA and the metal material paste thick film 41 are aligned in position, and the metal material paste thick film 41 is adhered to the capacitor main body LA. The metal material paste thick film 41 is adhered such that the gap DA and the gap DB are provided between the metal material paste thick film 41 and the multilayer body 2.

In this state, a reflow step is performed.

Figure 6C:
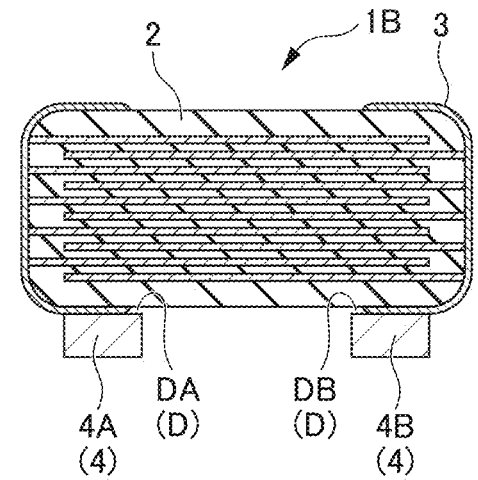

As a result, the metal in the metal material paste thick film 41 generates an intermetallic compound, and the metal material paste thick film 41 is cured to form the interposer 4 bonded to the capacitor main body LA and the external electrodes 3. Thereafter, the capacitor main body LA together with the interposer 4 is separated from the holding plate 40, and the state shown in FIG. 6C is obtained.

By the above steps, a multilayer ceramic capacitor 1B is manufactured in which the interposer 4 is attached to the capacitor main body LA while the insulating resin film 50 is not yet provided.

Insulating Resin Film Forming Step S3

The insulating resin film forming step S3 further includes an insulating resin providing step S31, an insulating resin expansion step S32, and an insulating resin curing step S33.

Insulating Resin Providing Step S31

Figure 6D:
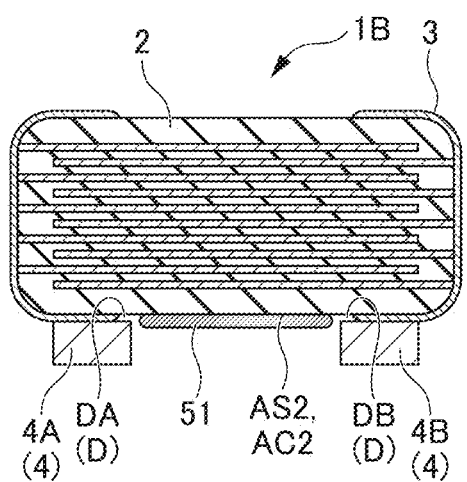

Next, as shown in FIG. 6D, a resin material 51 is provided onto the portion of the multilayer body second main surface AS2 of the board mounting surface AC2 of the multilayer ceramic capacitor 1B where the external electrode 3 is not provided. The resin material 51 is, for example, a fillerless thermosetting resin prior to curing, as a material of the insulating resin film. At this point of time, the resin material 51 has not yet entered the gap D.

Insulation Resin Expansion Step S32

Figure 6E:
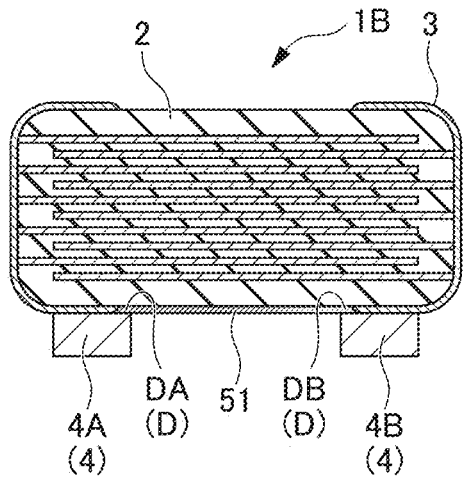

The multilayer ceramic capacitor 1B to which the resin material 51 has been applied is placed in a vacuum desiccator for about 15 minutes, for example. Here, the resin material 51 expands and enters the gap D as shown in FIG. 6E. The resin material 51 is degassed by placing the multilayer ceramic capacitor 1B in a vacuum desiccator for 15 minutes.

Insulating Resin Curing Step S33

When the multilayer ceramic capacitor 1B in which the resin material 51 has expanded and penetrated the gap D is placed in an environment at about 230° C. for about 60 minutes, for example, the resin material 51 is thermally cured. In the present preferred embodiment, a thermosetting resin is used as the resin material 51. However, the present invention is not limited thereto, and a photocurable resin may be used.

Figure 6F:
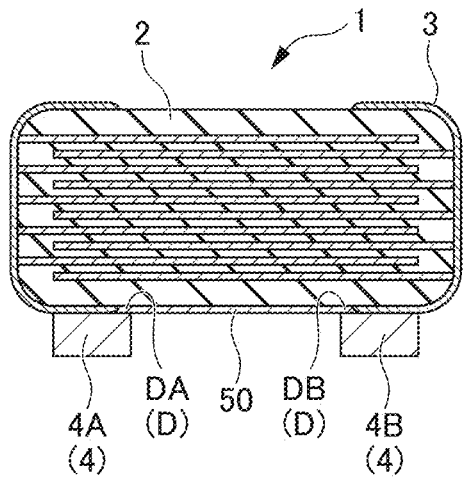

As a result, as shown in FIG. 6F, the insulating resin film 50 is formed by curing the resin material 51, and extends along the board mounting surface AC2 of the capacitor main body LA so as to fill the gaps D and connect the gap DA and the gap DB, such that the multilayer ceramic capacitor 1 is manufactured. Thereafter, the multilayer ceramic capacitor 1 is mounted on the board.

It should be noted that, in the first preferred embodiment, the resin material 51 is provided after the interposer 4 is provided. However, the present invention is not limited thereto, and the interposer 4 may be provided after the resin material 51 is provided.

Advantageous Effects of First Preferred Embodiment

Stress due to bending or other factors may be applied to the board where the multilayer ceramic capacitor 1 is mounted. At this time, when the insulating resin film 50 is not provided, there is a possibility that a corner portion K of the interposer 4 provided between the interposer-facing surface CI and the capacitor-facing surface AI shown in FIG. 2 is in contact with the portion of the multilayer body second main surface AS2 of the board mounting surface AC2 of the capacitor main body LA where the external electrode 3 is not provided.

At this time, the portion of the capacitor main body LA which is to be brought into contact with the corner portion K is a ceramic portion of the multilayer body 2 since the external electrode 3 is not provided thereat. Therefore, there is a possibility of cracks occurring in the ceramic portion when the stress is concentrated on the contact portion.

However, in the present preferred embodiment, the insulating resin film 50 is provided between the corner portion K of the interposer 4 and the portion of the multilayer body second main surface AS2 of the board mounting surface AC2. Therefore, the corner portion K is not in direct contact with the multilayer body second main surface AS2.

Therefore, it is possible to reduce or prevent the stress concentration due to the contact of the interposer 4 to the capacitor main body 1A, such that it is possible to reduce or prevent the possibility of cracking of the capacitor main body 1A.

Second Preferred Embodiment

Figure 7:
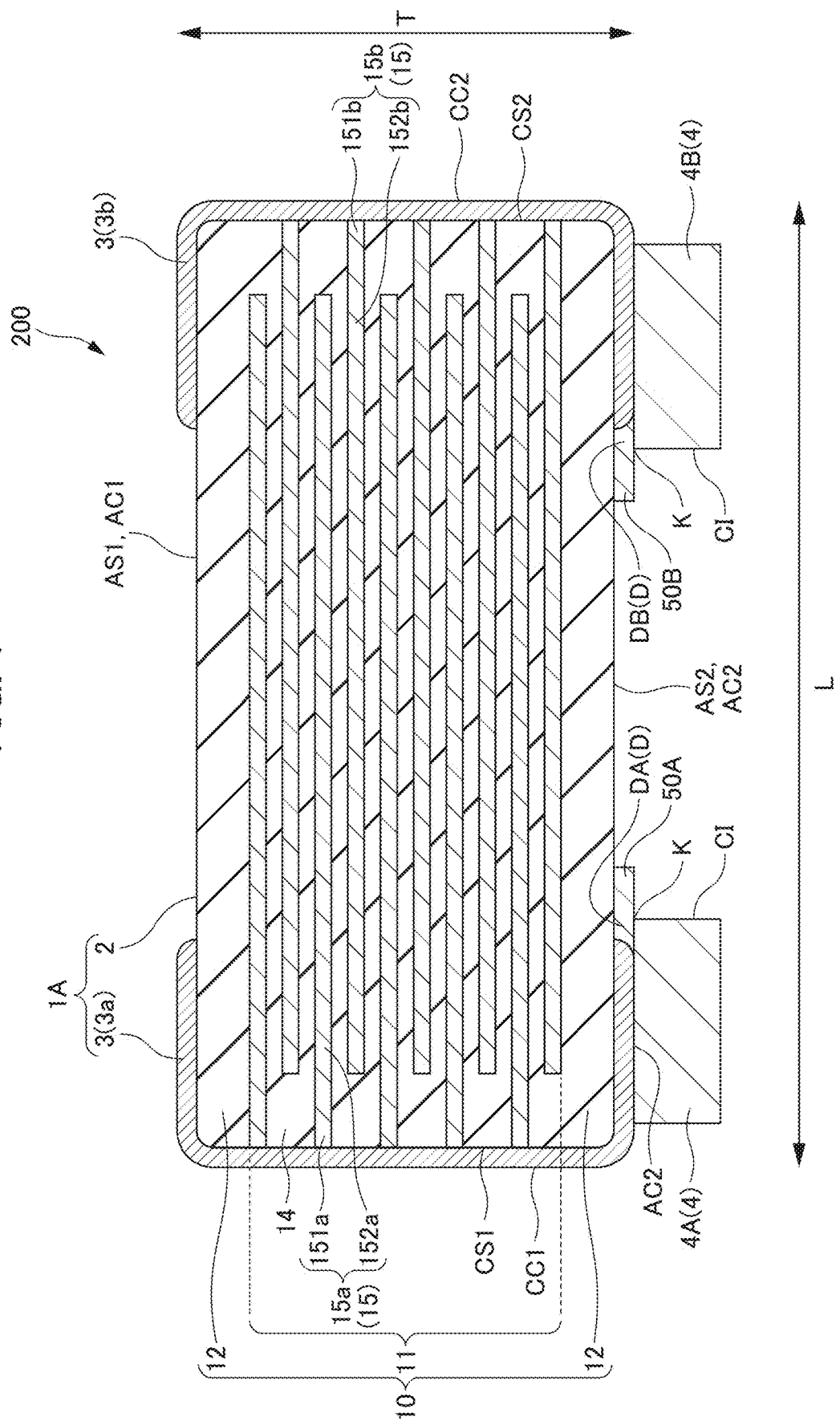
FIG. 7 is a cross-sectional view of a multilayer ceramic capacitor 200 according to a second preferred embodiment of the present invention.

Next, a multilayer ceramic capacitor 200 according to a second preferred embodiment of the present invention will be described. FIG. 7 corresponds to FIG. 2 of the first preferred embodiment, and is a cross-sectional view of the multilayer ceramic capacitor 200 of the second preferred embodiment.

The multilayer ceramic capacitor 200 of the second preferred embodiment is different from that of the first preferred embodiment in the insulating resin film 50, and the other configurations are the same or substantially the same as those of the first preferred embodiment, and thus descriptions thereof are omitted.

The insulating resin film 50 of the second preferred embodiment includes an insulating resin film 50A and an insulating resin film 50B. The insulating resin film 50A is provided in the gap DA in the vicinity of the first interposer 4A, and extends slightly from the gap DA toward the center in the length direction L. The insulating resin film 50B is provided in the gap DB in the vicinity of the second interposer 4B, and extends slightly from the gap DB toward the center in the length direction L. The insulating resin film 50A and the insulating resin film 50B are not connected to each other, and are separated from each other.

Thus, even when the insulating resin film 50 is separated into the insulating resin film 50A and the insulating resin film 50B, the insulating resin film 50A is provided between the corner portion K of the first interposer 4A and the portion of the multilayer body second main surface AS2 of the board mounting surface AC2, and the insulating resin film 50B is provided between the corner portion K of the second interposer 4B and the portion of the multilayer body second main surface AS2 of the board mounting surface AC2. Therefore, both corner portions K are not in direct contact with the multilayer body second main surface AS2.

Therefore, it is possible to reduce or prevent the stress concentration due to contact of the interposer 4 to the capacitor main body 1A, such that it is possible to reduce or prevent the possibility of cracking of the capacitor main body 1A.

Third Preferred Embodiment

Figure 8:
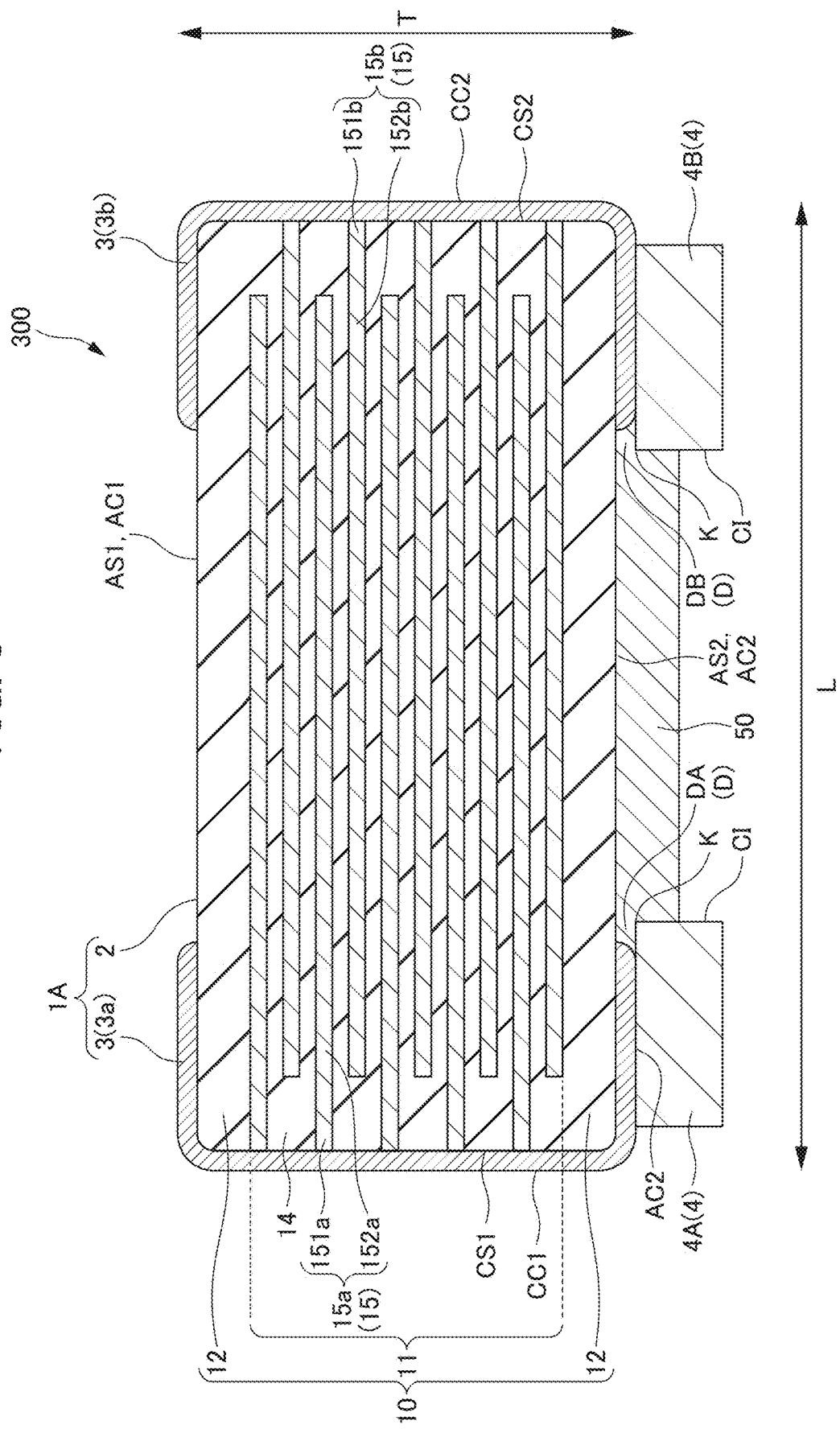
FIG. 8 is a cross-sectional view of a multilayer ceramic capacitor 300 according to a third preferred embodiment of the present invention.

Next, a multilayer ceramic capacitor 300 according to a third preferred embodiment of the present invention will be described. FIG. 8 corresponds to FIG. 2 of the first preferred embodiment, and is a cross-sectional view of a multilayer ceramic capacitor 300 according to the third preferred embodiment.

The multilayer ceramic capacitor 300 of the third preferred embodiment is different from that of the first preferred embodiment in the insulating resin film 50, and the other configurations are the same or substantially the same as those of the first preferred embodiment, and thus descriptions thereof are omitted.

The insulating resin film 50 of the third preferred embodiment is similar to that of the first preferred embodiment in that the insulating resin film 50 of the third preferred embodiment includes a portion provided in the gap DA in the vicinity of the first interposer 4A, a portion provided in the gap DB in the vicinity of the second interposer 4B, and a portion connecting the gap DA and the gap DB.

However, in the insulating resin film 50 of the third preferred embodiment, the thickness of the portion connecting the gap DA and the gap DB is thicker than the portion provided in the portion and the portion provided in the gap DB.

In the third preferred embodiment, the insulating resin film 50 is provided between the corner portion K of the first interposer 4A and the portion of the multilayer body second main surface AS2 of the board mounting surface AC2, and between the corner portion K of the second interposer 4B and the portion of the multilayer body second main surface AS2 of the board mounting surface AC2.

Therefore, both corners K are not in direct contact with the multilayer body second main surface AS2. Therefore, it is possible to reduce or prevent the stress concentration due to contact of the interposer 4 to the capacitor main body 1A, such that it is possible to reduce or prevent the possibility of cracking of the capacitor main body 1A.

Furthermore, since it is not necessary to strictly adjust the amount of the resin material 51 so that the thickness of the insulating resin film 50 becomes uniform when manufacturing the insulating resin film 50, it is easy to manufacture the multilayer ceramic capacitor 1.

Fourth Preferred Embodiment

Figure 9:
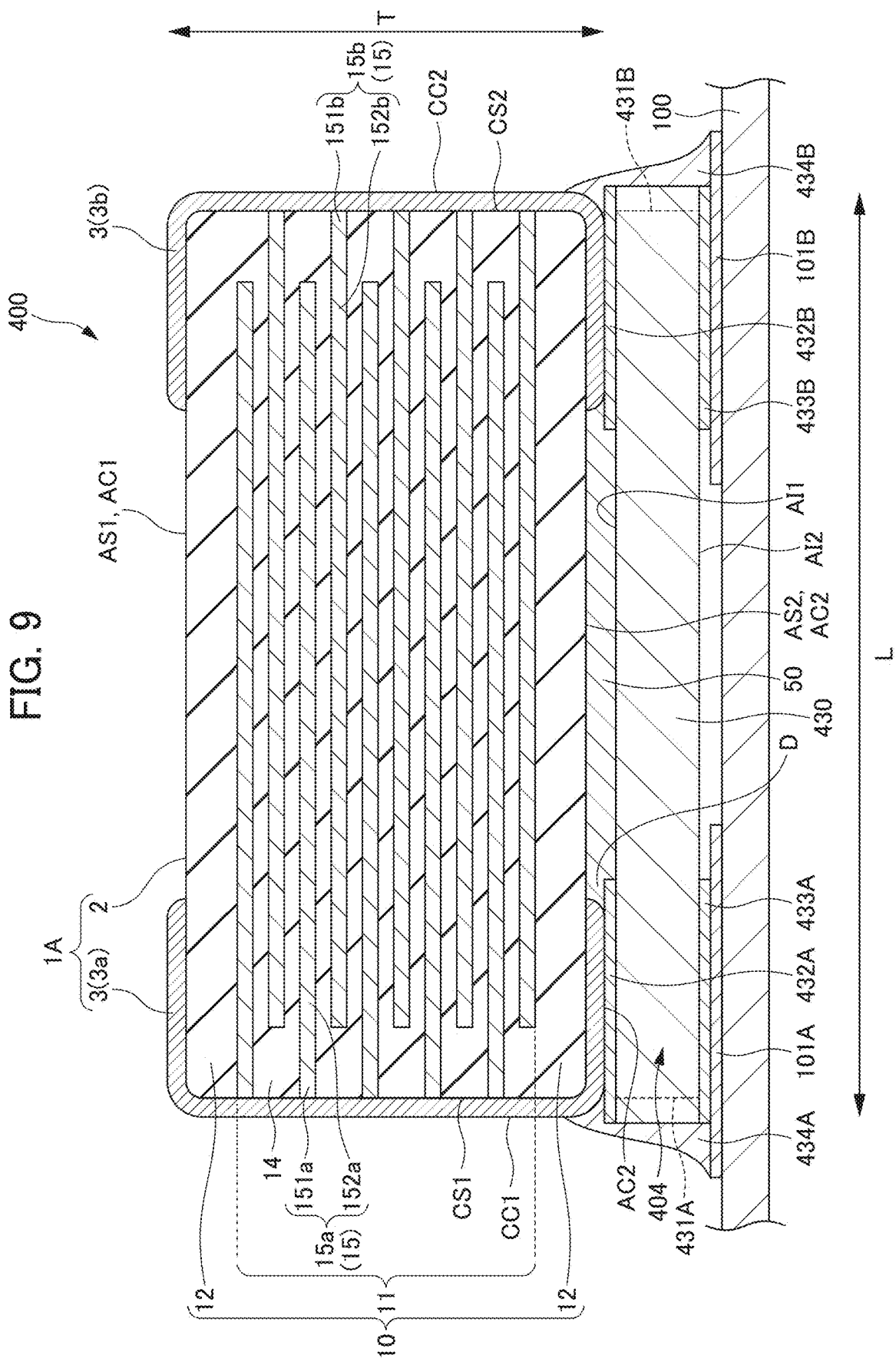
FIG. 9 is a cross-sectional view of a multilayer ceramic capacitor 400 according to a fourth preferred embodiment of the present invention.

Next, a multilayer ceramic capacitor 400 according to a fourth preferred embodiment of the present invention will be described. FIG. 9 is a cross-sectional view of the multilayer ceramic capacitor 400 of the fourth preferred embodiment, and also illustrates a board 100 on which the multilayer ceramic capacitor 400 is mounted.

Since the capacitor main body 1A according to the fourth preferred embodiment is similar to that of the first preferred embodiment, description thereof will be omitted.

An interposer 404 of the fourth preferred embodiment is not divided into the first interposer and the second interposer. The interposer 404 includes a single plate-shaped board main body 430, a first main body connecting electrode 432A and a second main body connecting electrode 432B, and a first mounting electrode 433A and a second mounting electrode 433B.

The board main body 430 is made of an insulating resin. Furthermore, a first groove portion 431A and a second groove portion 431B are provided at the center in the width direction W of both end surfaces of the board main body 430. The first groove portion 431A and the second groove portion 431B each extend in the lamination direction T, and have a semicircular arc shape in a plane.

The first main body connecting electrode 432A and the second main body connecting electrode 432B are provided on the capacitor-facing surface AI of the board main body 430. The first main body connecting electrode 432A is connected to the external electrode 3a by, for example, solder or the like. The second main body connecting electrode 432B is connected to the external electrode 3b by, for example, solder or the like.

A gap D is provided between the capacitor-facing surface AI of the interposer 404 and the multilayer body second main surface AS2 of the multilayer body 2, which is a portion of the capacitor second main body AC2 of the capacitor main body LA. The thickness in the lamination direction T of the gap D is equal or substantially equal to a thickness obtained by adding the external electrode 3 and the main body connecting electrode 432, and the insulating resin film 50 is provided in the gap D.

The first mounting electrode 433A and the second mounting electrode 433B are provided on the board mounting surface AI2 of the board main body 430. On the other hand, the board 100 includes a first mounting land 101A and a second mounting land 101B.

When mounting the interposer 404 on the board 100, a first mounting electrode 433A of the interposer 404 and a first mounting land 101A of the board 100 are connected by, for example, solder or other material or method, and a second mounting electrode 433B and a second mounting land 101B are connected by, for example, solder or other material or method.

Solder is provided in the first groove portion 431A to fill the first groove portion 431A, and extends beyond the first main body connecting electrode 432A over the first external electrode 3a. The solder further extends beyond the first mounting electrode 433A over the first mounting land 101A to define a first side surface electrode 434A. The first side surface electrode 434A provides electrical conduction among the main body connecting electrode 432A, the mounting electrode 433A, and the first mounting land 101A.

Solder is provided in the second groove portion 431B to fill the second groove portion 431B, and extends beyond the second main body connecting electrode 432B over the second external electrode 3b. The solder further extends beyond the second mounting electrode 433B over the second mounting land 101B to define a second side surface electrode 434B. The second side surface electrode 434B provides electrical conduction among the main body connecting electrode 432B, the mounting electrode 433B, and the second mounting land 101B.

In a case of manufacturing the multilayer ceramic capacitor 400 of the fourth preferred embodiment, for example, unlike the first preferred embodiment, the interposer 404 is provided after the resin material 51 is provided, and then the insulating resin film is cured.

In the case of the fourth preferred embodiment, since the interposer 404 is a single plate member, the corner portion K does not exist. However, even in this case, if the insulating resin film 50 is not provided, when stress due to bending or other factors is applied to the mounting board on which the multilayer ceramic capacitor 400 is mounted, a portion of the capacitor-facing surface AI of the interposer 404 is brought into contact with the multilayer body second main surface AS2 and pressed, and the stress is concentrated in the contact portion, such that there is a possibility of cracks occurring in the multilayer body second main surface AS2.

However, in the fourth preferred embodiment, the insulating resin film 50 is provided between the capacitor-facing surface AI of the interposer 404 and the multilayer body second main surface AS2. Therefore, the capacitor-facing surface AI of the interposer 404 is not in direct contact with the multilayer body second main surface AS2. Therefore, it is possible to reduce or prevent the stress concentration due to contact of the interposer 4 to the capacitor main body 1A, such that it is possible to reduce or prevent the possibility of cracking of the capacitor main body 1A.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a capacitor main body including:
      a multilayer body including a multilayer body first main surface and a multilayer body second main surface that are opposed to each other in a lamination direction, a multilayer body first end surface and a multilayer body second end surface that are opposed to each other in a length direction, and a multilayer body first side surface and a multilayer body second side surface that are opposed to each other in a width direction intersecting the lamination direction and the length direction;
      a first external electrode on the multilayer body first end surface; and
      a second external electrode on the multilayer body second end surface;
   a first interposer on the first external electrode;
   a second interposer on the second external electrode; and
   an insulating resin film; wherein
   each of the first interposer and the second interposer includes:
      a capacitor opposing surface being one of surfaces opposed to each other in the lamination direction and being an outer surface adjacent to the capacitor main body; and
      an interposer opposing surface opposed to each other between the first interposer and the second interposer;
   the capacitor opposing surface includes an electrode connection region in contact with a corresponding one of the first and second external electrodes, and an electrode non-connection region extending toward a center in the length direction from the electrode connection region;
   the first interposer and the second interposer are spaced apart from each other; and
   the insulating resin film is between the electrode non-connection region and the multilayer body second main surface.

2. The multilayer ceramic capacitor according to claim 1, wherein the insulating resin film is a thermosetting resin or a photocurable resin.

3. The multilayer ceramic capacitor according to claim 1, wherein
   each of the first interposer and the second interposer includes a corner portion of the electrode non-connection region; and
   the insulating resin film is between the corner portions and the multilayer body second main surface.

4. The multilayer ceramic capacitor according to claim 1, further comprising:
   a gap between the electrode non-connection region and the multilayer body second main surface; wherein the insulating resin film includes:
- a first portion in the gap adjacent to the first interposer;
- a second portion in the gap adjacent to the second interposer; and
- a connection portion connected between the first portion and the second portion.

5. The multilayer ceramic capacitor according to claim 4, wherein the connection portion connected between the first portion and the second portion is thicker than the first portion or the second portion.

6. The multilayer ceramic capacitor according to claim 1, further comprising:
- a gap between the electrode non-connection region and the multilayer body second main surface; wherein
the insulating resin film includes:
- a first portion in the gap adjacent to the first interposer;
- a second portion in the gap adjacent to the second interposer;
- a portion extending from the first portion toward a center in the length direction; and
- a portion extending from the second portion toward the center in the length direction; and
the portion extending from the first portion toward the center in the length direction and the portion extending from the second portion toward the center in the length direction are not connected to each other.

7. The multilayer ceramic capacitor according to claim 1, further comprising:
- a gap between the electrode non-connection region and the multilayer body second main surface; wherein
the insulating resin film includes:
- a first portion in the gap adjacent to the first interposer;
- a second portion in the gap adjacent to the second interposer; and
- a portion on the interposer opposing surface.

8. The multilayer ceramic capacitor according to claim 7, wherein the portion on the interposer opposing surface is thicker than the first portion or the second portion.

9. The multilayer ceramic capacitor according to claim 1, wherein each of the first interposer and the second interposer includes, as a main component, an intermetallic compound including at least one high melting point metal selected from Cu and Ni, and Sn as a low melting point metal.

10. The multilayer ceramic capacitor according to claim 9, wherein each of the first interposer and the second interposer includes the intermetallic compound and elemental Sn metal.

11. The multilayer ceramic capacitor according to claim 1, wherein, in the multilayer body:
- a dimension in the length direction is about 0.2 mm or more and about 10 mm or less;
- a dimension in the width direction is about 0.1 mm or more and about 10 mm or less; and
- a dimension in the lamination direction is about 0.1 mm or more and about 5 mm or less.

12. The multilayer ceramic capacitor according to claim 1, wherein
the multilayer body includes a multilayer body main body;
the multilayer body main body includes:
- an inner layer portion; and
- outer layer portions on both sides of the inner layer portion in the lamination direction; and
each of the outer layer portions has a thickness of about 20 μm or less.

13. The multilayer ceramic capacitor according to claim 12, wherein each of the outer layer portions has a thickness of about 10 μm or less.

14. The multilayer ceramic capacitor according to claim 12, wherein
the multilayer body includes side gap portions on both sides of the multilayer body main body in the width direction; and
each of the side gap portions has a thickness of about 20 μm or less.

15. The multilayer ceramic capacitor according to claim 14, wherein each of the side gap portions has a thickness of about 10 μm or less.

* * * * *